United States Patent [19]
Ueda et al.

[11] 3,790,266
[45] Feb. 5, 1974

[54] MICROFICHE PROJECTING APPARATUS

[75] Inventors: Hiroyuki Ueda; Yukio Sawano, both of Asaka, Japan

[73] Assignee: Fuji Shashin Film Kabushiki Kaisha, Kanagawa-ken, Japan

[22] Filed: Oct. 12, 1971

[21] Appl. No.: 188,228

[30] Foreign Application Priority Data
Oct. 24, 1970 Japan................................. 45/93662
Nov. 5, 1970 Japan................................. 45/97350

[52] U.S. Cl..................... 353/27, 353/95, 353/99, 355/76
[51] Int. Cl.... G03b 23/08, G03b 1/52, G03b 21/28
[58] Field of Search....... 353/27, 95, 96, 23, 98, 99; 355/75, 76, 95, 53; 33/1 M, 184.5

[56] References Cited
UNITED STATES PATENTS

| | | |
|---|---|---|
| 3,528,735 | 9/1970 | Bluitt et al............................ 353/27 |
| 2,847,901 | 8/1958 | Sassaman et al...................... 353/27 |
| 3,617,126 | 11/1971 | Gillespie............................ 33/184.5 |
| 3,509,651 | 5/1970 | Robbins et al........................ 353/27 |

Primary Examiner—Louis R. Prince
Assistant Examiner—Steven L. Stephan
Attorney, Agent, or Firm—Stevens, Davis, Miller & Mosher

[57] ABSTRACT

In an apparatus for projecting a microfiche, a microfiche holder is demountably mounted on a stage which is movable in a horizontal plane. The microfiche holder is formed with a notch and positioned on the stage, with said notch being engaged by a stopper pin provided on said stage. In changing the microfiche holder, the stage is fixed and a focal plane determining member for retaining the microfiche on the focal plane is moved out of contact with the microfiche.

8 Claims, 4 Drawing Figures

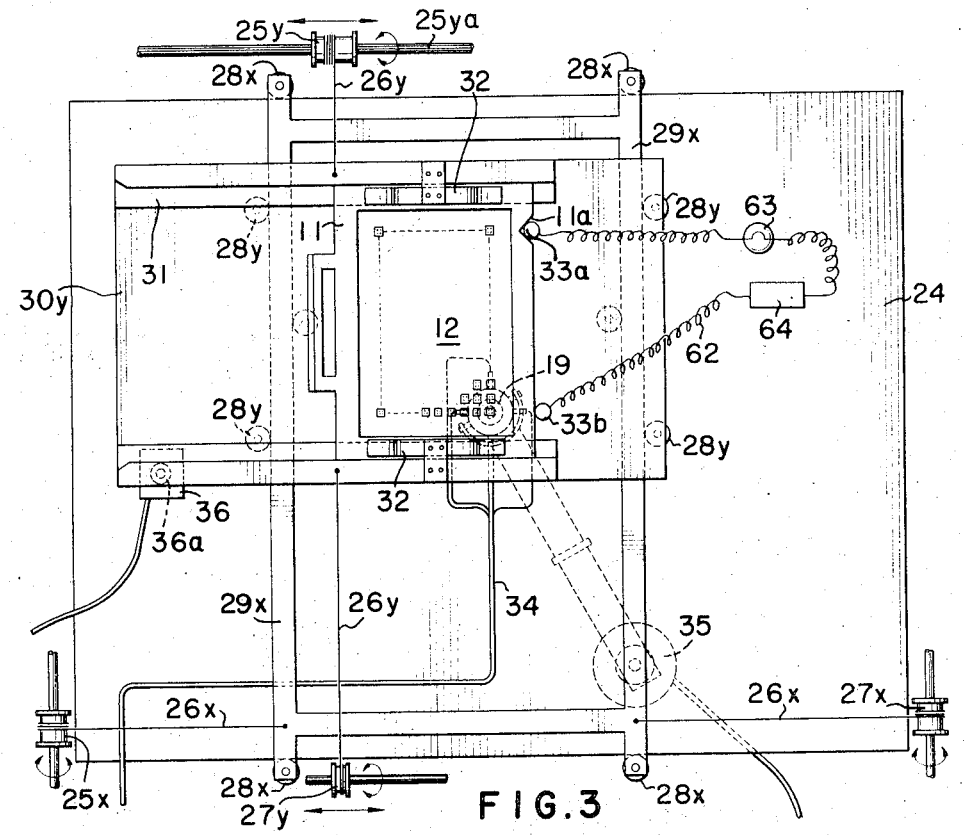
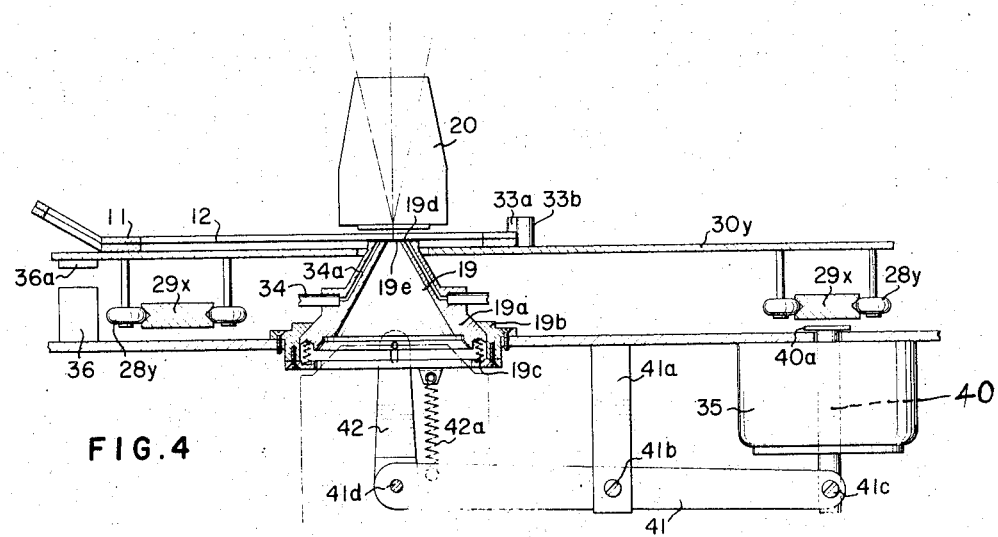

MICROFICHE PROJECTING APPARATUS

BACKGROUND OF THE INVENTION

This invention relates to improvements in the microfiche projecting apparatus for selectively projecting a desired frame of a microfiche having a large number of pages of a document, papers or the like recorded therein in a contracted form. More specifically, the invention relates to a mechanism in the microfiche projecting apparatus of the type described, by which one microfiche can be readily and easily replaced by another microfiche.

The microfiche used in the subject microfiche projecting apparatus refers to one having a size of 4 × 6 inch which can contain more than 1,000 frames of photographic images at a contraction ratio of one hundredth or higher.

In using such a microfiche as described above having images densely recorded therein, in a projecting apparatus, it is customary that the frames of the microfiche are selectively changed one after another. Therefore, it is necessary to project the pertinent frame automatically and quickly on a screen in response to a retrieval command. It is also necessary to project the frame of the microfiche correctly on the center of the screen. For this reason, the frame shifting accuracy at the time of photography and that at the time of projection have been restricted to be ± 0.1 mm or less. This is for the purpose of restricting the positional deviation of the image, projected on the screen at the magnification of 100, to be within 2 cm. If the positional deviation of the images selectively projected on the screen sequentially is greater than ± 2 cm, the projected image of the frame will go off the screen, necessitating that the viewer correct the image position each time, this will prolong the period from the time when the retrieval command is given to the time when the image is observed. This problem may be solved by making the screen larger by a space corresponding to the amount of positional deviation of the projected image, but in this case, the viewer's eyes must be shifted each time the frame is changed, which causes fatigue of the viewer and is also uneconomical from the standpoint of construction of the apparatus.

Thus, a microfiche projecting apparatus is desired in which a desired frame of the microfiche can be retrieved quickly within a period of 1 second and the image recorded therein can be projected on a screen with a positional accuracy of ± 2 cm or less.

On the other hand, a microfiche which can accommodate 1,000 images each in each frame, normally can record one volume of a document or book. However, several microfiches are required for recording a book consisting of a greater number of pages or a document of which is written in a plurality of volumes. Furthermore, in such a case, it occasionally becomes necessary to observe a few selected frames of one microfiche at first and then a few of selected frame of the other microfiche upon changing the microfiche, and so on, depending upon the type of document. On such occasion, it is essential that the microfiches be exchanged one after another quickly and with high positional accuracy.

With this objective, the microfiche projecting apparatus mentioned above which is capable of retrieving a desired frame of the microfiche quickly and projecting the image thereof with high positional accuracy, is required to be designed such that it is also capable of successively continuously projecting the desired frames of a plurality of microfiches which will be mounted in the apparatus one after another, without causing any detrimental effect on the retrieval and projection of the frames of the successive microfiche. Should the position of the successive microfiche deviate from that of the preceding microfiche in the apparatus when the microfiches are exchanged, the images of all frames of the latter microfiche would be displaced, making the observation of the viewer troublesome. On the other hand, if the position of the frame is corrected by any means at each time the microfiche is exchanged, the continuity of projecting operation will be lost and a desired frame cannot be quickly selected from the pertinent microfiche.

Thus, a microfiche projecting apparatus is desired in which the positional deviation will not occur even when the microfiches are exchanged and which can maintain the continuity of frame retrieval and projecting operation.

Although the present invention will be described herein with reference to an embodiment in which the microfiches are exchanged, it should be understood that the invention is also applicable to such apparatus in which reproductive media other than microfiches, such as printing plates, IC photomasks, printing boards and photo-composing masters, are to be exchanged in a quick and simple manner. However, in this specification including the appended claims these reproductive media will be generally called "microfiche" for the sake of simplicity.

SUMMARY OF THE INVENTION

The first object of the present invention is to provide a microfiche projecting apparatus which is capable of retrieving a desired frame of a densely recorded microfiche at a speed of 1 second or shorter and projecting the image of said frame on a screen with a positional accuracy of ± 2 cm or higher.

The second object of the invention is to provide a microfiche projecting apparatus in which a positional deviation of microfiches will not occur even when the microfiches are exchanged and which can maintain the continuity of frame retrieval and projecting operation.

A further object of the invention is to provide a mechanism for quickly shifting a microfiche in both an X and Y directions, which comprises means for locking a microfiche shifting stage so as to enable a microfiche to be exchanged with the other microfiche in a positive manner, means for temporarily moving an optical unit away from the path of microfiche at the time of exchanging the microfiche and means for quickly returning the optical unit to the original position upon completion of the exchanging operation.

In order to attain these objects, in the microfiche projecting apparatus of the instant invention a stage is provided on a member movable in a horizontal plane and a microfiche holder is demountably mounted on said stage and positioned thereon by a stopper provided on said stage which is engaged in a notch formed in said holder.

Further, when the microfiche holder is to be exchanged with another one, the stage is held against movement and a focal plane determining member for retaining the microfiche on the focal plane is disengaged from the microfiche, thereby to enable the microfiche to be exchanged with another one quickly and accurately.

BRIEF DESCRIPTION OF THE DRAWING

FIG. 3 is a plan view showing a microfiche shifting mechanism of the microfiche projectin apparatus of the invention; and FIG. 4 is a sectional side view of the microfiche shifting mechanism shown in FIG. 3.

DESCRIPTION OF THE PREFERRED EMBODIMENT

Figure 1:
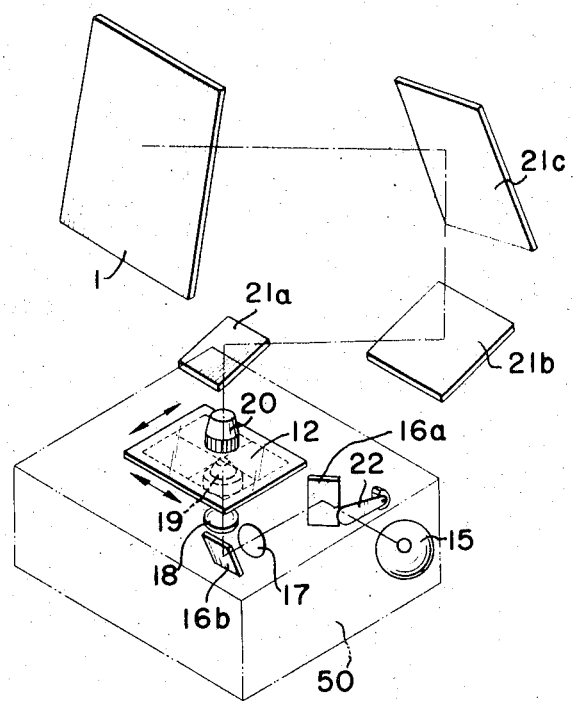
FIG. 1 is a perspective view showing the microfiche projecting apparatus of the invention and an optical projecting system provided therein.

The present invention will be described in detail with reference to the drawing. In FIG. 1 there is shown the microfiche projecting apparatus and the optical system thereof of the invention. In a microfiche shifting device 50 are disposed an electric circuit for shifting a microfiche, including a driving source, a servo motor and a servo amplifier, and an illuminating portion of the optical system, including a light source 15, a shutter 22, cold mirrors 16a and 16b, a heat intercepting filter 17 and a condenser 18. The microfiche 12 is held by vacuum on a focal plane determining member 19 to be retained in the focal plane and an image recorded thereon is illuminated by a series of said illuminating members during projection of the image for observation. The illuminated image is projected on a screen 1 by a projection lens 20 via mirrors 21a, 21b and 21c.

Figure 2:
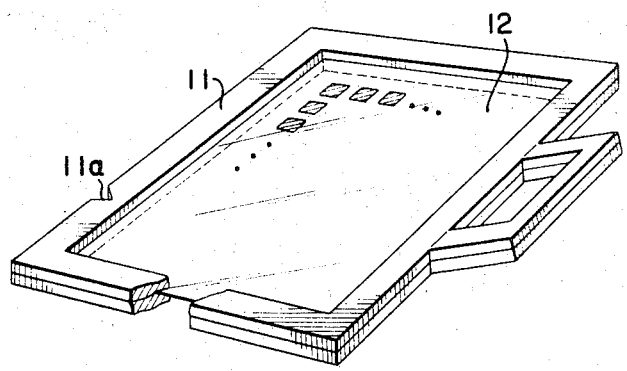
FIG. 2 is a perspective view showing a microfiche holder used with the microfiche projecting apparatus of the invention.

FIG. 2 is a perspective view of a microfiche holder 11, with a portion thereof broken away to show the manner in which the microfiche 12 is loaded in said holder. The holder 11 consists of two frame members each having a thickness of 1.5 mm, and the microfiche is sandwiched by said two frame members and secured thereto by means of screws. By employing such holder, the flexible microfiche 12 can be stretched taut and exchanging of the microfiche is facilitated. Further, in order to facilitate the positional accuracies of the loaded holder 11 in both an X and Y directions, it is necessary that the relative position of the holder 11 and the frames of the microfiche is pre-set with accuracy, and all microfiches are prepared with such consideration. Furthermore, the holder is fabricated with high dimensional accuracy and rectangularity so as to enhance the accuracy of relative position of the holder and the apparatus, and is formed with a V-shaped notch 11a so as to eliminate even a slight positioning error. The term "V-shaped notch" includes a notch whose bottom is slightly rounded or a notch whose bottom is flat which has two points of contact.

Now, a mechanism for quickly shifting the loaded microfiche in both the X and Y directions will be described with reference to FIGS. 3 and 4.

In FIG. 3, reference numeral 24 designates a top plate of the apparatus, on which is mounted a rack 29x. The rack 29x is supported by four rollers 28 and lightly movable in the direction of X or in the left and right direction as viewed in FIG. 3, with said rollers 28 rolling on rails extending along the opposite edges, i.e., the upper and lower edges as viewed in FIG. 3, of the top plate 24. The movement of the rack 29x is effected by the driving force of a servo motor, which is transmitted to said rack 29x through a reel 25x at the left lower end of the figure and a wire 26x. The wire 26x is in the form of a loop extending from the reel 25x to a reel 27x through the rack 29x and back to the reel 25x. Thus, it will be seen that the rack 29x is shifted in the direction of X or the left and right direction of the Figure when the reel 25x is rotated in one or the other direction. As a member for shifting the microfiche holder in the direction or Y, a stage 30y mounted on the rack 29x, with four rollers 28y being rollably supported on rails provided along the left and right edges of said rack 29x. On the stage 30y are provided rails 31 for receiving the microfiche holder 11. The stage 30y is movable in the direction of Y on the rack 29x, with the rollers 28y rolling on the rails and such movement of the stage 30y is effected through reels 25y, 27y and a wire passing around said reels, similar to the movement of the rack 29x in the direction of X. As may be obvious to those skilled, the members associating with the movement of the stage 30y in the direction of Y must be movable independently of the movement of the same in the direction of X. Therefore, the arrangement is made such that the reels 25y, 27y are axially movable and also rotatable. Further, a shaft 25ya on which the reel 25y is mounted, is a spline shaft so that said reel 25y may be rotatable to transmit the driving force regardless of the position of the stage 30y in the direction of X.

In order that the microfiche-loaded holder 11 may be exchanged in such an apparatus as described above, the following technical problems must be solved: Namely, the microfiche having a large number of images recorded therein is usually in the form of a film having a thickness of about 0.1 mm, so that it may be light in weight, may not take a large space when a number of them are to be stored and may not require any work after reproduction. Because of such meritorious features, in projecting an image recorded in such flexible film by using a projecting apparatus, a sharp image cannot be maintained on a screen unless the image recorded portion of the film is stretched taut and securely held in a fixed position. Where the microfiche is sandwiched by dry plates or glass sheets, the mechanical precision of the stage and shifting mechanism must be high so that any frame may be aligned with the focal plane when brought into the projecting position.

For maintaining the frame in alignment with the focal plane, a member 19 shown in FIG. 4 is used. The member 19 provides the focal plane 19d and has an opening 19e of 3 mm in diameter at the center thereof on which the film image is to be placed. The image is illuminated from the underside. Suction holes each having a diameter of about 0.5 mm are provided at four locations peripherally of the opening 19e, which are respectively communicated with external hoses 34 through slots 34a. The external hoses 34 are in turn communicated with a pump through a solenoid valve. During observation, air is drawn from these suction holes, thereby to attract the image recorded frame of the microfiche onto the focal plane 19d and to obtain a fresh picture. The member 19 also serves to conduct the heat therethrough from the microfiche which is heated by the radiant heat of the illuminating light, and thereby to protect the microfiche against burning.

In order that the microfiche be quickly attracted onto the focal plane determining member 19 under suction or released therefrom, the distance between said microfiche and said focal plane determining member cannot be made too long, although the microfiche is flexible per se. Therefore, the focal plane determining member 19 should be positioned such that the focal plane 19d thereof is located about 0.5 mm beneath the microfiche.

On the other hand, for the sake of convenience in exchanging the microfiche in the projecting apparatus, which has the above-described meritorious features owing to its flexibility, it is desirable that the microfiche is sandwiched firmly by the stiff metallic holder 11. As stated previously, the holder 11 consists of upper and lower frame members tightened together from both sides of the microfiche by means of screws, and each having a thickness of 1.5 mm. Therefore, in exchanging the microfiche holder 11 mounted in the projecting apparatus with another one, by sliding the latter in the rails 31 shown in FIG. 3, the lower frame member of the holder 11 abuts against the upper portion of the focal plane determining member 19, making it impossible to exchange the microfiche. Such trouble can be eliminated by arranging such that the microfiche holder 11 is mounted and demounted in the direction of the optical axis or in a vertical direction. However, such arrangement is very disadvantageous from the standpoint of arrangement of the optical system, and the exchanging of the holder can be achieved more simply by sliding the holder horizontally rather than mounting and demounting the same vertically. Thus, it becomes necessary to lower the focal plane determining member 19 at the time of exchange. It is one of the objects of the present invention to solve this problem.

Another technical problem is that the stage must be securely fixed at the time of exchanging the microfiche. Namely, the movable members of the microfiche shifting mechanism each are of light weight so as to bring the desired frame into the projecting position, and it is also for this reason that the wires are used for the power transmission. Therefore, if a force is applied to the holder 11 to slide it in the rails 31 during the holder exchanging operation, the movable members will be shifted, exerting an unreasonable force on each component part. For example, the wires are stretched and a reverse force is applied to the servo motor, with the result that a dead time occurs during the normal use of the motor and the positional accuracy of the frame is spoiled during the image projection.

Thus, it will be understood that the stage 30y must be fixed during the microfiche exchanging operation. However, it is not particularly necessary to fix the stage 30y against movement in the direction of Y, since the force is applied in the direction X during the microfiche exchanging operation.

As stated above, it is firstly necessary to lower the focal plane determining member 19 and secondly to fix the stage 30y, during the microfiche exchanging operation, and the present invention aims to solve these two technical problems.

The function and effect of the claimed apparatus in respect of these subjects will be described in detail with reference to FIGS. 3 and 4.

When the necessity for exchanging the microfiche has arisen during the projection of a desired frame of the microfiche after loading of said microfiche and retrieval of the desired frame, a microfiche exchanging switch is pushed, whereupon a signal is given to a retrieval system. The retrieval system in turn issues a shifting signal to the microfiche shifting mechanism and said mocrifiche shifting mechanism is shifted to the point of origin, i.e., to a position to project the first frame of the microfiche, and held stationary thereat. On the other hand, the signal from the microfiche exchanging switch is given to a shutter 22 to block the illumination light bundle and simultaneously given to a solenoid 35. However, the solenoid 35 is not actuated only by this signal. As a member for verifying the fact that the microfiche has returned to the point of origin, a position verifying switch 36 is provided which is adapted to issue a signal upon sensing an iron piece 36a fitted to the underside of the stage 30y, when said iron piece 35a is located right above said switch. The arrangement is made such that the solenoid 35 will be actuated by an "and" circuit (series circuit) of the signal from the microfiche exchanging switch and the signal from the position verifying signal.

In the arrangement shown, the drive of the solenoid 35 causes a bar 41 to teeter about a pivot pin 41b at the lower end of a supporting post 41a. The opposite ends of the bar 41 are pivotally connected to a shaft 40 of the solenoid 35 and a focal plane determining member elevating lever 42 by pivot pins 41c, 41d respectively, to form a link mechanism. Because of such link mechanism, the shaft 40 of the solenoid and the focal plane determining member elevating lever 42 move up and down differentially.

Namely, when the solenoid 35 is actuated, the shaft 40 moves upward and a friction plate 40a provided at the top end thereof pushes the rail 29x up, whereby the stage 30y is secured. Thus, the stage 30y is held immovably and the point of origin is maintained even when a force is applied in the direction of X during the microfiche exchanging operation. Namely, one of the technical probelms set forth above is solved.

On the other hand, the actuation of the solenoid 35 causes a downward movement of the elevating lever 42 which moves the focal plane determining member 19 vertically. As a result, a vertically movable portion 19a of the focal plane determining member 19 moves down while compressing a spring 19c disposed between it and a stationary portion 19b. At the same time, a return spring 42 is stretched.

On the other hand, when the solenoid 35 is deenergized the focal plane determining member 19a moves up under the biasing force of the springs 19c and 42a, and is set in the projecting position.

By constructing in the manner described above, the microfiche holder can be inserted into the stage 30y up to the positions of th stoppers 33a, 33b or withdrawn therefrom, without colliding against the upper portion of the focal plane determining member 19, including the focal plane 19d. Thus, the second technical problem is solved.

Having solved the two technical problems in the manner described, it becomes possible to exchange the microfiche easily quickly, by holding the microfiche in the metallic holder 11 which is easy to handle, and sliding said metallic holder in the rails 31.

By the completion of the above-described operation after pushing the microfiche exchanging switch, all preparator operations for the exchange of microfiche are completed.

Now, the members involved in the exchange and positioning of the microfiche will be described hereunder, which are critical in the present invention. First of all, the microfiche holder 11 is inserted from the left to right as viewed in FIG. 3, while causing it to slide in the rails 31 on the stage 30y by a handle. The microfiche holder 11 is stopped by the columnar stoppers 33a, 33b. The stoppers 33a, 33b are not necessarily columnar in shape but may be of any other shape, e.g. a spherical or disc shape. These stoppers are mounted on the stage 30y but electrically insulated therefrom and connected to a power source 64 and a pilot lamp 63 by an electric wire 62. Thus, it will be understood that the stoppers 33a and 33b serve as electric contacts. When the holder 11 is completely inserted and set in the final position, a closed circuit is formed across the stoppers 33a, 33b through the holder 11, so that the pilot lamp is turned on indicating that the holder 11 has been set in the prescribed position in the direction of X.

By the pilot lamp, the operator will be able to aware of the fact that the holder has not been set in the prescribed position during the microfiche mounting operation or the fact that the holder mounted in the apparatus has been displaced from the prescribed position during the retrieval and projection of the microfiche. However, the microfiche holder 11 is not allowed to move in a vertical direction or in a demounting direction as it has the opposite edges held down from the upper side by spring plates 32. Furthermore, during insertion of the microfiche, the pilot lamp is turned on indicating the point when the operator should remove the force applied to the holder, so that breakage of the stationary members can be avoided which would otherwise be caused by an unnecessary force applied thereto.

In order to ensure correct positioning of the microfiche, the holder 11 is formed with the notch 11a as stated previously, which will be engaged by the stopper 33a at two points, and the portion of the holder opposite to said notch 11a will be contacted by the stopper 33b. It should be understood that the portion other than the notch 11a of the holder 11 may be contacted by two or more stoppers, but in this case, the positioning effect of those stoppers would be lessened unless all of the stoppers are provided in alignment with each other and concurrently brought into contact with the holder. By providing such notch and stoppers, a slight gap between the rails 31 and the holder 11 can be absorbed by said notch 11a, whereby the positional accuracy of the holder 11 in the direction of Y is further enhanced, and the positional accuracy of the same in the direction of X is also enhanced by the effect of said notch combined with the effect of the stopper 33b. Therefore, in no cases will the holder 11 be inserted in a twisted state, and the gap between the rails 31 and the holder 11 can be made large enough to provide for easy insertion of said holder, which is advantageous economically because the machining precision can be lowered.

The holder 11 having such notch formed therein may be molded of plastics, but in this case, it will be evident that a conductive strip must be provided at the portions contacted by the stoppers 33a, 33b and said contacting portions must be electrically connected by a conductive wire. In the embodiment described herein, the holder 11 is contacted by the stopper 33a at two points in the notch 11a and by the stopper 33b at one point. However, a greater positioning effect can be obtained by arranging such that the pilot lamp is turned on by a current supplied through an "and" circuit (series circuit) which is formed by connecting three independent electric contacts, provided by said respective contacting points, in a known manner, and the positioning of the holder in both the X and Y directions can be indicated by said pilot lamp.

While it may be considered to increase the number of contacting points and provide an electric contact at each one of them, from the practical point of view the provision of one or two V-shaped notches and one additional contacting point at the end opposite to said notch or notches is sufficient to obtain the desired positioning effect.

It should also be understood that while the embodiment described herein comprises the pilot lamp for indicating the electrical connection of all contacts, as shown in FIG. 3, a buzzer or relay may be used in lieu of the light emanating lamp for mechanically indicate such electrical connection.

We claim:

1. A microfiche projecting apparatus including an optical projecting system for projecting an image from the microfiche onto a screen, comprising a microfiche holder for retaining the microfiche therein, a slidable member having a portion to receive said holder, means for demountably fixing said holder to said slidable member, means for moving said slidable member in a plane to selectively bring different frames of said microfiche into alignment with the optical axis of said optical projecting system, a focal plane determining member, means for moving the focal plane determining member toward contact with the microfiche to maintain it there at the time of projection and for moving said focal plane determining member away from the microfiche when the microfiche is to be exchanged, a friction member and means for urging said friction member into contact with a portion of said slidable member moving means for holding said slidable member immovably when the microfiche is exchanged and means for conjointly operating said focal plane determining member and said friction member urging means.

2. A microfiche projecting apparatus as defined in claim 1, wherein the means for conjoint operation is actuated by a solenoid.

3. A microfiche projecting apparatus as defined in claim 1, wherein said means for conjoint operation is a shaft vertically moved by a solenoid which is linked by a lever pivotably supported at the center thereof.

4. A microfiche projecting apparatus as defined in claim 1, wherein said holder has at least one notch formed in one end face thereof, while said slidable member has at least two stopper pins provided thereon, at least one of said stopper pins being engaged by said notch and the other one thereof being engaged by a portion of said end face of the holder remote from said notch, whereby said holder is positioned on said slidable member.

5. A microfiche projecting apparatus as defined in claim 4, which further comprises electric contacts provided at least at a portion of said notch and at said portion of the end face of the holder which is contacted by said stopper pin, respectively, a conductor electrically connecting said electric contacts with each other, and signaling means including a power source and electrically connected with the stopper pin to be brought into contact with said notch and the stopper pin to be brought into contact with said portion of the end face of the holder, whereby the positioning of the holder on said slidable member by said stopper pins is signaled by said signaling means.

6. The apparatus of claim 1 including means for moving the microfiche into contact with the focal plane determining member after said member is moved toward the microfiche.

7. The apparatus of claim 6 in which the microfiche moving means is at least one suction passage in the focal plane determining member.

8. The apparatus of claim 1 in which the focal plane determining member is made of thermally conductive material.

* * * * *